UNITED STATES PATENT OFFICE.

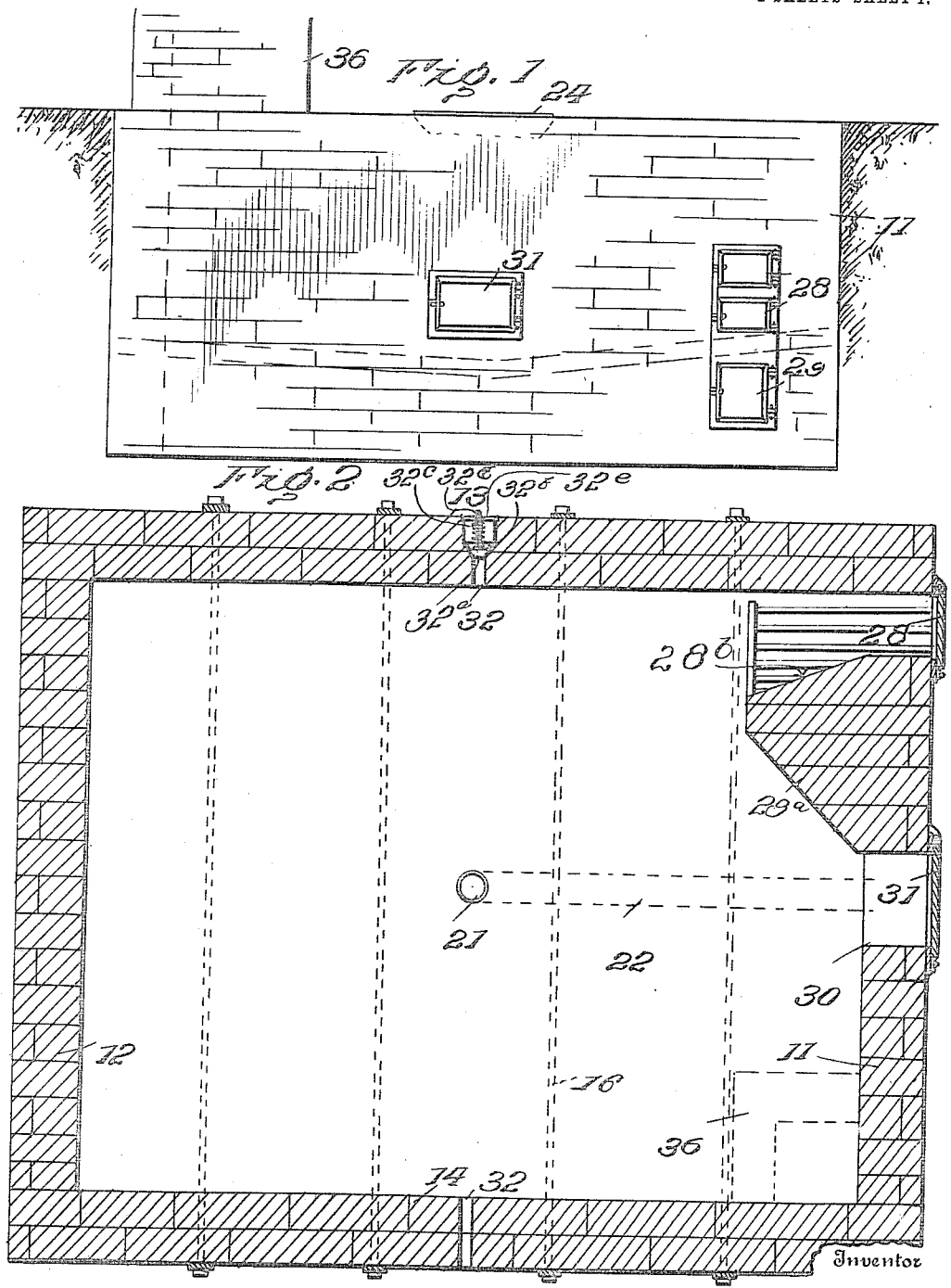

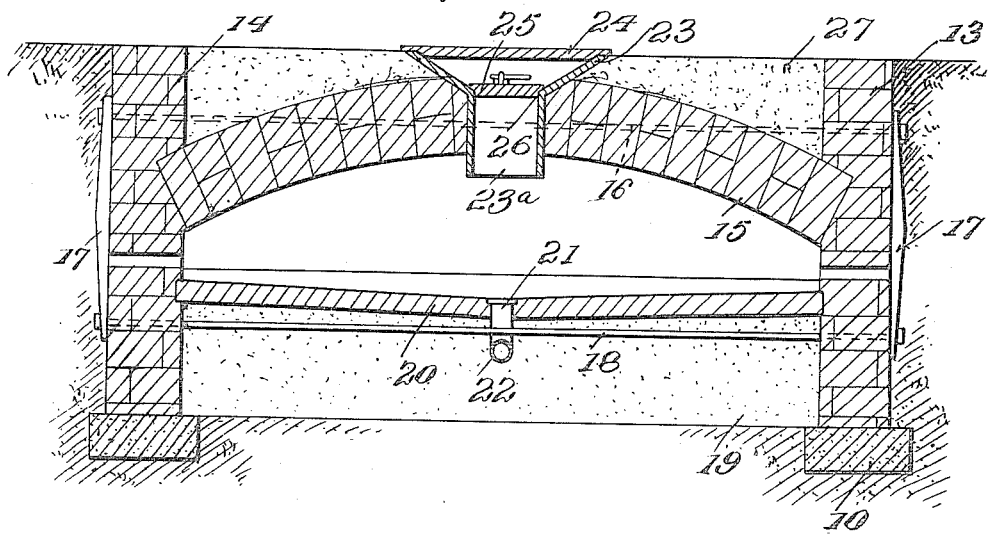
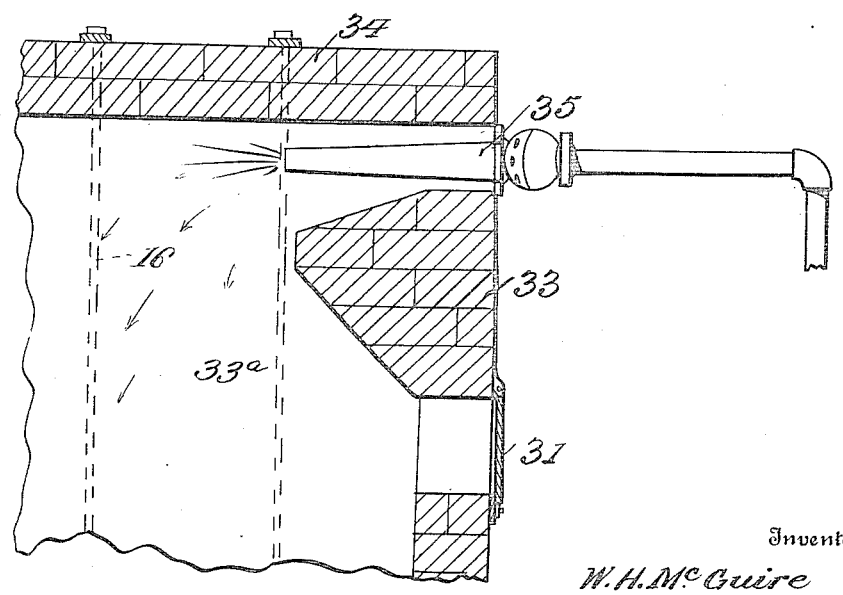

WILLIAM H. McGUIRE, OF HOBART, OKLAHOMA.

FURNACE.

971,548. Specification of Letters Patent. Patented Oct. 4, 1910.

Application filed March 10, 1909. Serial No. 482,538.

*To all whom it may concern:*

Be it known that I, WILLIAM H. MC-GUIRE, a citizen of the United States, residing at Hobart, in the county of Kiowa and State of Oklahoma, have invented certain new and useful Improvements in Furnaces, of which the following is a specification.

This invention relates to furnaces and refers particularly to a furnace adapted for the combustion of refuse material.

An object of this invention is to construct a furnace which is so formed that the refuse material may be easily positioned within the same and so that the residue may be readily withdrawn from the furnace through an opening provided therefor in a quick and easy manner.

The invention has for another object the provision of an improved arch which is formed entirely of fire-brick so as to withstand the high temperature which is effected through the novel positioning of the flue of the furnace in relation to the combustion chamber thereof; and which is effected by means of the arrangement of elements comprising the furnace to form a draft through the same which facilitates the combustion of the fuel as well as the refuse to be burned.

The invention further aims to provide a draining system by means of which the liquid incident to the heating of the refuse is conveyed from the furnace and also aims to provide valves which are disposed in the sides of the furnace for the escape of steam and other gases, when excess of pressure is effected which are formed during the combustion taking place within the furnace and thereby prevents any accident due to the formation and combustion of gases.

For a full understanding of the invention reference is to be had to the following description and accompanying drawings, in which:—

Figure 1 is a front elevation of the complete furnace. Fig. 2 is a horizontal section through the same. Fig. 3 is a vertical transverse section through the furnace, and Fig. 4 discloses a modification of the fire-box showing the application of a burner thereto.

Corresponding and like parts are referred to in the following description and indicated in all the views of the drawings by the same reference characters.

Referring to the drawings the numeral 10 designates a cementitious foundation embedded in the earth at a considerable distance below the surface and is arranged rectangularly, the foundation being preferably positioned upon a bed of rock in order to form a solid support for the device. The foundation 10 supports the end walls 11 and 12 which are disposed in parallel and which co-act with side walls 13 and 14, arranged at right angles to the walls 11 and 12, to form the body of the furnace. The side walls 13 and 14 are provided with an arched roof 15 which extends the entire length of the walls 13 and 14 and longitudinally between the same, the arched roof 15 being formed of fire-brick and being terminated in the walls which are also formed of fire-brick. The fire-brick is held together by means of a mortar which is made from fire-clay and cement or a like hard material which is not acted upon to any appreciable extent by heat.

The flue 36 is built of brick and extends downwardly within the furnace when it is terminated in the under surface of the arched roof 15. The arched roof 15 is supported between the walls 13 and 14 by means of a plurality of tie-rods 16 transversely disposed between the walls 13 and 14, the tie-rods 16 being engaged at their intermediate portions through the arch 15, and through the walls 13 and 14 at their opposite extremities. The tie-rods 16 are terminated in the upper ends of braces 17 which are positioned against the outer faces of the walls 13 and 14 and are depended therefrom, the lower extremities of the braces 17 being provided with a second set of tie-rods 18 which are transversely disposed through and across the walls 13 and 14 to strengthen the body of the furnace. Disposed upon the bed of rock and about the foundation 10 between the walls 11 and 12 and 13 and 14 is a body of sand 19 which fills the body of the furnace about one-third of the height of the walls and over which is supported a flooring 20 formed of fire-brick and rested upon the body of sand. The flooring 20 is sloped centrally from the opposite walls in order to drain the liquid accumulated thereon to a central point of the flooring 20 through which an outlet pipe 21 is positioned. The outlet 21 is connected to a pipe 22 which extends forwardly within the body of sand 19 and is connected to any suitable drain conduit which is adaptable for the purpose.

Centrally disposed through the arched roof 15 is a pipe 23ª terminating at its upper end in a hopper 23 which is provided with a cover 24 for the purpose of closing the upper end of the same. The pipe 23$^a$ is provided with a closure 25 which engages upon the upper edge of the pipe 23$^a$ adjacent the reduced portion of the hopper and is provided with a shoulder 26 to seat the closure 25 in position in order to prevent the passage of gas upwardly therethrough. The arched roof 15 is provided with a body of sand 27 or the like upon its upper face which is flush with the upper edges of the walls of the furnace and over which wagons are adapted to pass to gain access to the hopper 23 in order to empty their contents through the hopper. The hopper 23 flares upwardly into the plane of the upper edges of the walls of the furnace and extends through the body of sand 27. The forward wall 11 of the furnace is provided at one end adjacent the wall 13 with a fire box which comprises an aperture formed through the wall 11 and an enlargement 28$^a$ which is beveled inwardly as at 28$^b$ and which is closed by means of hinged doors 28 through which is passed the fuel adapted to heat the furnace. Beneath the doors 28 is a door 29 which regulates the passage through an opening formed through the wall 11 immediately beneath the fire box to admit of the withdrawal of ashes which are formed during the combustion of the fuel. The door 29 is mounted upon the wall 11 beneath the plane of the floor 20, disclosed in Figs. 1 and 5 and controls the passage beneath the grate upon which the fuel is disposed. Intermediately positioned in the wall 11 and in alinement with the bottom 20 is an opening 30 which is closed by a door 31, the opening 30 serving the purpose of admitting of the withdrawing of the residue from the refuse after the burning of the same.

The walls 13 and 14 are provided with vents 32 in which are positioned valves 32$^a$ for admitting of the passage of gases from the interior of the furnace and for checking the inflow of air thereto. The valves which are located in the walls 13 and 14 each comprise the disk or valve proper 32$^a$ which rests upon an outwardly extended shoulder 32$^b$ and is held in such position by a helical spring 32$^c$ disposed about a valve stem 32$^d$. The valve stem 32$^d$ passes through a brace 32$^e$ engaged against the outer side of the adjacent wall (13 or 14) and across the outer end of the vent 32. This forms a guide for the stem 32$^d$ and an abutment for the outer end of the spring 32$^c$. An outward pressure from the furnace compresses the spring 32$^c$ and admits of the escape of gases about the disk 32$^a$ and shoulder 32$^b$. A flue 36, which is adapted to conduct the smoke and gases from the fire box of the furnace, is positioned at the adjacent ends of the walls 11 and 14 and is thus oppositely disposed from the fire box to necessitate the passage of the products of combustion through the chamber of the furnace, to derive a maximum benefit of the heat from the same with respect to the refuse deposited upon the floor or bottom 20.

In the modification disclosed in Fig. 4 the front wall 33 is provided at one end adjacent the side wall 34 with an opening which forms the fire-box and into which is extended an oil burner 35 of adaptable construction for the purpose of burning a liquid or gaseous fuel within the furnace when such is desired and is convenient. In this modification the burner 35 is extended through the wall 33 above the floor 33$^a$ in order to eject the gas from the same into the body of the furnace against the refuse disposed therein.

In using a furnace of this character and construction the cover 24 is raised from the hopper 23 and the closure 25 is withdrawn from the upper end of the pipe 23$^a$. This admits of the dumping of refuse matter from a wagon or the like which is disposed over the hopper 23 upon the body of sand 27, the material passing into the furnace through the pipe 23$^a$ and falling upon the floor 20. The fire is now started within the fire box and the heated gases and smoke from the same are drawn within the furnace and caused to pass upwardly through the flue 36 heating the interior of the furnace. By reason of the construction of the walls and of the arched roof 15 of the fire-brick the same are permitted to be raised to a high temperature, the same being raised to a white heat in which event the refuse material is quickly reduced. The residue may be easily withdrawn through the opening 30 when the door 31 is opened in any well-known and convenient manner. The valves 32$^a$, by reason of their peculiar mounting as shown in Fig. 2, permit of the escape of gases from the interior of the furnace but close upon the suction of air to the combustion chamber from the outside of the structure.

Having thus described the invention what is claimed as new is:

1. In an incinerating furnace, the combination with a rectangular body portion, of a centrally inclined floor located therein, and terminated in the opposite corners of the same, an arched roof arranged in the body portion above said floor and terminated in the opposite corners, a feed hopper disposed through the central portion of said roof, a firebox arranged at the end of one of the walls of the body portion, an outlet flue positioned through said roof at the opposite end of the said wall, a clean-out door positioned centrally in the wall to open between said floor and said roof, and relief valves located in the side walls of said body portion.

2. A refuse burning furnace including a rectangular body portion, a centrally inclined floor located in said body portion, an arched roof arranged in said body portion above said floor, a feed hopper located through the central portion of said arched roof, a firebox arranged at one end of the front wall of said body portion, a clean-out door centrally positioned in the front wall, and an outlet flue arranged in the body portion at the opposite end of the wall.

In testimony whereof I affix my signature in presence of two witnesses.

WILLIAM H. McGUIRE. [L. S.]

Witnesses:
 JOHN R. WILLIAMS,
 ED. L. BARNES.